United States Patent [19]

Lowenhaupt et al.

[11] Patent Number: 4,541,868

[45] Date of Patent: Sep. 17, 1985

[54] RECOVERY OF NICKEL AND COBALT BY CONTROLLED SULFURIC ACID LEACHING

[75] Inventors: E. Harris Lowenhaupt, Gasquet, Calif.; John E. Litz, Lakewood; Dennis L. Hoe, Broomfield, both of Colo.

[73] Assignee: California Nickel Corporation, Crescent City, Calif.

[21] Appl. No.: 516,235

[22] Filed: Jul. 22, 1983

[51] Int. Cl.$^4$ .................... C01G 53/00; C01G 55/00; C22B 3/00

[52] U.S. Cl. .................... 75/101 R; 75/108; 75/115; 75/119; 423/140; 423/141; 423/146; 423/150

[58] Field of Search ............ 423/123, 140, 141, 146, 423/150, 155; 75/101 R, 115, 119, 108

[56] References Cited

U.S. PATENT DOCUMENTS

| | | | |
|---|---|---|---|
| 2,842,427 | 7/1958 | Reynaud et al. | 23/183 |
| 2,872,306 | 2/1959 | Morrow | 75/101 |
| 2,971,836 | 2/1961 | Hall | 75/119 |
| 3,082,080 | 3/1963 | Simons | 75/115 |
| 3,093,559 | 6/1963 | White | 204/123 |
| 3,293,027 | 12/1966 | Mackiw et al. | 75/119 |
| 3,333,924 | 8/1967 | Hazen et al. | 23/165 |
| 3,365,341 | 1/1968 | Fitzhugh, Jr. et al. | 75/119 |
| 3,466,144 | 9/1969 | Kay | 23/183 |
| 3,473,920 | 10/1969 | Fitzhugh, Jr. et al. | 75/109 |
| 3,720,749 | 3/1973 | Taylor et al. | 423/141 |
| 3,737,307 | 6/1973 | Fitzhugh, Jr. et al. | 75/109 |
| 3,761,566 | 9/1970 | Michal | 423/141 |
| 3,773,891 | 11/1973 | O'Neill | 423/139 |
| 3,793,432 | 2/1974 | Weston | 423/143 |
| 3,804,613 | 4/1974 | Zundel et al. | 75/101 R |
| 3,809,549 | 5/1974 | Opratko | 75/101 R |
| 3,991,159 | 11/1976 | Queneau et al. | 423/150 |
| 4,012,484 | 3/1977 | Lussiez | 423/53 |
| 4,044,096 | 8/1977 | Queneau et al. | 423/150 |
| 4,065,542 | 12/1977 | Subramanian et al. | 423/35 |
| 4,097,575 | 6/1978 | Chou et al. | 423/150 |
| 4,098,870 | 7/1978 | Fekete et al. | 423/123 |
| 4,195,065 | 3/1980 | Duyvesteyn | 423/150 |
| 4,410,498 | 10/1983 | Hatch et al. | 423/150 |

OTHER PUBLICATIONS

Boldt, Jr., Joseph R., *The Winning of Nickel*, Longmans Canada Limited, 1967, pp. 439–440.

"Freeport Nickel's Moa Bay Puts Cuba Among Ranking Ni-Producing Nations", Engineering and Mining Journal, vol. 160, No. 12, Dec. 1959, pp. 84–92.

*Primary Examiner*—John Doll
*Assistant Examiner*—Robert L. Stoll
*Attorney, Agent, or Firm*—Sheridan, Ross & McIntosh

[57] ABSTRACT

According to the present invention, improved dissolution of nickel and cobalt and thus improved recovery of those desired metal values is achieved by modifying the ore recovery processes wherein sulfuric acid leaching at elevated temperatures is used to dissolve the nickel and cobalt. In particular, according to the present invention, processes are provided wherein the sulfuric acid and ore are contacted at substantially ambient temperature prior to subsequent heating to attain the elevated temperatures of the sulfuric acid leach. Practice of the present invention has been found to result in improved metal value recovery.

11 Claims, No Drawings

RECOVERY OF NICKEL AND COBALT BY CONTROLLED SULFURIC ACID LEACHING

FIELD OF INVENTION

This invention relates to the recovery of nickel and cobalt from lateritic ores, and, in particular, to a method of sulfuric acid leaching which maximizes the solubility of the desired nickel and cobalt values.

BRIEF DESCRIPTION OF THE PRIOR ART

A wide variety of processes are known for the recovery of nickel and/or cobalt from various nickel-bearing ores including laterite and serpentine ores. Basic to one class of processes is the solubilizing of the nickel and/or cobalt by sulfuric acid leaching followed by neutralization. Since the sulfuric acid leach is central to the extraction, a number of different process parameters and conditions have been developed in order to maximize dissolution of the desired metals during the leach.

U.S. Pat. No. 3,991,159 is representative of prior art processes wherein sulfuric acid leaching is carried out at elevated temperatures, e.g. 200 to about 300° C., and elevated pressures, e.g. 225 to 1750 psig. Other examples of such sulfuric acid leaching are disclosed in U.S. Pat. Nos. 4,044,096, 4,195,065, and 3,466,144.

In each of these prior art references, it is taught that the sulfuric acid should be added to an already heated ore slurry. For example, in U.S. Pat. No. 4,195,065, the ore slurry is preheated to a temperature of 230°–300° C. before the sulfuric acid is added and a leach at that temperature is performed. In U.S. Pat. No. 3,466,144 the slurry is preheated to 400°–500° F. before acid addition. Similarly, in U.S. Pat. No. 4,044,096 the acid addition is to a preheated slurry in or at the entrance of the autoclave. In fact, adding the sulfuric acid to a preheated slurry has been considered the preferred method for as long as these processes have been known and used. Many existing U.S. patents described and are based upon the process developed in connection with operations at Moa Bay, Cuba. These operations are described in detail in the article entitled "Freeport Nickel's Moa Bay Puts Cuba Among Ranking 'Ni-Producing' Nations", *Engineering and Mining Journal*, Vol. 160, No. 12, December 1959, pp. 84–92. The article specifically teaches that the best results are obtained when sulfuric acid is added to the slurry after the leach reaction temperature has been obtained.

It has now been discovered that cold addition of $H_2SO_4$ prior to attaining the leach reaction temperature advantageously affects Ni and Co dissolution and recovery.

SUMMARY OF THE INVENTION

According to the present invention, improved dissolution of nickel and cobalt and thus improved recovery of those desired metal values is achieved by modifying the ore recovery processes wherein sulfuric acid leaching at elevated temperatures is used to dissolve the nickel and cobalt. In particular, according to the present invention, processes are provided wherein the sulfuric acid and ore are contacted at substantially ambient temperature prior to subsequent heating to attain the elevated temperatures of the sulfuric acid leach. Practice of the present invention has been found to result in improved metal value recovery.

DETAILED DESCRIPTION OF THE INVENTION

The present invention provides for improved methods of recovering the metal values, i.e. nickel and cobalt, from laterite ores wherein the ore is leached with sulfuric acid at elevated temperatures to dissolve the desired metal values and thereafter the metal values are recovered from the leach liquor. In particular, the process of the invention provides for the addition of the sulfuric acid to the ore, i.e. contacting the ore with sulfuric acid, prior to heating or otherwise attaining the desired elevated temperature for leaching.

As described hereinabove, a number of different processes utilizing sulfuric acid leaching are known for recovery of nickel and cobalt from ores such as lateritic ores. The benefits of the present invention can be achieved in conjunction with virtually any process wherein the sulfuric acid leach is at elevated temperatures.

In general, feed material to processes in which the present invention can be applied is a laterite ore containing some or all of the following major constituents: peridotite, saprolite, hematite, magnetite, geothite, garnierite, maghemite, and aluminum oxides. Typically, the laterite ore is slurried and sized by conventional methods. Some or all of the ore is contacted at elevated temperatures and pressures with sulfuric acid, typically at temperatures of from about 200° to about 270° C. and more typically at about 240° C., and pressures of from 400 to 700 psig. In general, the leach will continue for a time period sufficient to solubilize or leach the nickel and cobalt present into solution. The specific parameters of the various leach processes described in U.S. Pat. Nos. 4,044,096, 4,195,065 and 3,466,144 are incorporated herein by reference.

The leach slurry which comprises the leach residue and a leach liquor is then separated by conventional liquid/solid separation means such as by countercurrent decantation. The liquor is then advantageously concentrated by evaporator before being neutralized. Typical neutralizing agents are magnesium oxide or hydroxide and/or magnesium-rich ore or ore fractions. Following neutralization the liquor is again separated from any solids present and may be thickened and/or concentrated by evaporator before passing to conventional metal recovery, such as contact with $H_2S$ and/or $H_2$ to precipitate Ni and Co, or by adding a neutralizing agent to precipitate hydroxides of Co and/or Ni.

As will be understood by those skilled in the art, the process of the present invention wherein the $H_2SO_4$ and ore are contacted at lower than conventional temperatures may be applied to any of the known processes described generally hereinabove to achieve enhanced Co and Ni dissolution into $H_2SO_4$ leach liquor. In the preferred embodiment of the present invention the ore and $H_2SO_4$ are contacted at ambient conditions, i.e. room temperature frequently from about 20° to about 30° C. and at atmospheric pressure. However, improved dissolution may be achieved by contacting at virtually any temperature from about ambient to below the temperature of the subsequent leach step.

The following example is provided by way of illustration and not by way of limitation.

EXAMPLE

A series of tests were performed comparing the effect on nickel and cobalt dissolution by sulfuric acid leaching when H₂SO₄ was added before and after reaching the elevated leach temperature. Leaching in each instance was for 60 minutes at 240° C. and 550 psig. The leach residue was analyzed and results obtained are tabulated in Table I.

TABLE I

| Test No. | Sulfuric acid addition (lb/Ton) | Residue % Ni | Residue % Co | Dissolution % Ni | Dissolution % Co |
|---|---|---|---|---|---|
| 1A | 675[1] | 0.16 | 0.017 | 85 | 89 |
| B | 675[2] | 0.085 | 0.012 | 92 | 92 |
| 2A | 700[1] | 0.105 | 0.014 | 90.3 | 90.0 |
| B | 700[2] | 0.087 | 0.006 | 91.3 | 95.1 |
| 3A | 915[1] | 0.099 | 0.009 | 92.0 | 94.1 |
| B | 910[2] | 0.047 | 0.005 | 96.3 | 96.2 |

[1] Injected into pulp at leach conditions.
[2] Added to pulp at ambient temperature and pressures prior to advancing into leach autoclave.

Although the foregoing invention has been described in some detail by way of illustration and example for purposes of clarity and understanding, it will be obvious that certain changes and modifications may be practiced within the scope of the invention, as limited only by the scope of the appended claims.

What is claimed is:

1. A method of recovering nickel and cobalt from lateritic ores by sulfuric acid leaching comprising:
   (a) mixing the sulfuric acid for said leaching with said ore at a temperature from about ambient temperature to below the leach temperature of step (b);
   (b) leaching said nickel and cobalt from said ore at a temperature above about 200° C. to form a nickel- and cobalt-containing pregnant leach liquor and a leached residue with no sulfuric acid addition at said leach temperature;
   (c) separating said pregnant leach liquor from said residue; and
   (d) recovering said nickel and cobalt from said pregnant leach liquor.

2. A method according to claim 1 wherein said ore is a laterite ore fraction of less than −1 inch in size.

3. A method according to claim 11 further comprising mixing said sulfuric acid and said ore at at temperature below about 160° C.

4. A method according to claim 3 further comprising heating the mixture of ore and sulfuric acid to a temperature of from about 200° C. to about 270° C. whereby nickel and cobalt are dissolved into a pregnant liquor.

5. A method according to claim 3 further comprising contacting said pregnant leach liquor with H₂S to precipitate NiS.

6. A method according to claim 3 further comprising contacting pregnant leach liquor with H₂ to reduce any cobalt present to its elemental state.

7. A method according to claim 3 further comprising contacting said pregnant leach liquor with a base to precipitate the hydroxides of any nickel and cobalt present.

8. In a method of recovering nickel and cobalt from lateritic ores comprising contacting said ore with an H₂SO₄ leach liquor at a temperature of from about 200° C. to about 270° C. to solubilize said nickel and cobalt into said leach liquor and thereafter recovering said nickel and cobalt from said leach liquor, the improvement comprising adding substantially all the H₂SO₄ of said leach liquor to said ore at a temperature from about ambient to below about 160° C. and thereafter heating said mixture to a temperature of from about 200° C. to about 300° C.

9. The improvement of claim 8 wherein said adding is at ambient temperature and atmospheric pressure.

10. In a method of enhancing the dissolution of nickel and cobalt from nickel- and cobalt-containing lateritic ore into a H₂SO₄ leach liquor comprising adding the H₂SO₄ of said leach liquor to said ore at about ambient temperature and atmospheric pressure and heating said mixture to a temperature of from about 200° C. to about 300° C. for a time period sufficient to solubilize substantially all of said nickel and cobalt with no further addition of H₂SO₄ after said heating.

11. In a method of enchancing the dissolution of nickel and cobalt from nickel- and cobalt containing lateritic ore into a sulfuric acid leach liquor wherein said H₂SO₄ leach liquor is contacted with said ore at a temperature from about 200° C. to about 300° C. for a time period sufficient to solubilize substantially all of said nickel and cobalt, the improvement comprising adding the H₂SO₄ of said leach liquor to said ore at about ambient temperature and atmospheric pressure so that substantially all of the sulfuric acid is present during the heating of the ore to said temperature.

* * * * *